(12) United States Patent
Vora et al.

(10) Patent No.: US 9,470,298 B2
(45) Date of Patent: Oct. 18, 2016

(54) STRAIGHT TRACKING CONTROL SYSTEM FOR A MACHINE WITH A DUAL PATH ELECTRONICALLY CONTROLLED HYDROSTATIC TRANSMISSION

(71) Applicant: CNH AMERICA LLC, New Holland, PA (US)

(72) Inventors: Kushan Vora, Willowbrook, IL (US); Navneet Gulati, Naperville, IL (US); David Schulte, Clarendon Hills, IL (US); Joseph R. Shoemaker, West Burlington, IA (US); Swapnil Tandel, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 329 days.

(21) Appl. No.: 14/065,977

(22) Filed: Oct. 29, 2013

(65) Prior Publication Data

US 2014/0180542 A1 Jun. 26, 2014

Related U.S. Application Data

(60) Provisional application No. 61/740,750, filed on Dec. 21, 2012, provisional application No. 61/740,772, filed on Dec. 21, 2012, provisional application No. 61/740,788, filed on Dec. 21, 2012, provisional application No. 61/740,811, filed on Dec. 21, 2012.

(51) Int. Cl.
| | |
|---|---|
| *B60W 10/00* | (2006.01) |
| *F16H 39/14* | (2006.01) |
| *E02F 9/22* | (2006.01) |
| *F16H 61/431* | (2010.01) |
| *F16H 61/46* | (2010.01) |
| *E02F 3/84* | (2006.01) |
| *F16H 61/47* | (2010.01) |

(52) U.S. Cl.
CPC ............ *F16H 39/14* (2013.01); *B60K 41/004* (2013.01); *E02F 3/841* (2013.01); *E02F 9/2246* (2013.01); *E02F 9/2292* (2013.01); *F16H 61/431* (2013.01); *F16H 61/46* (2013.01); *F16H 61/47* (2013.01)

(58) Field of Classification Search
None
See application file for complete search history.

(56) References Cited

U.S. PATENT DOCUMENTS

| | | |
|---|---|---|
| 3,247,919 A | 4/1966 | Moon, Jr. |
| 3,795,107 A | 3/1974 | Ward |
| 3,914,938 A | 10/1975 | Cornell et al. |
| 4,019,596 A | 4/1977 | Crull |
| 4,023,637 A | 5/1977 | Jackovich |

(Continued)

*Primary Examiner* — John R Olszewski
*Assistant Examiner* — Nicholas K Wiltey
(74) *Attorney, Agent, or Firm* — Patrick M. Sheldrake

(57) ABSTRACT

The straight tracking control system can use a control method to achieve a desired straight motion of a machine with a dual path electronically controlled hydrostatic transmission. In the control method, the first drive system, e.g., the left or right drive system, pump solenoid current can be modified based on first and second drive system velocity feedback when the machine is commanded to move in a straight line path in the forward or reverse direction. A memory latching concept is used to latch the straight tracking factor at the initiation of and during the turn so the same straight tracking factor is used throughout the turn. The straight tracking factor is unlatched at the completion of a turn after a specific time delay and a new straight tracking factor can be calculated. The straight tracking method also utilizes transmission fluid temperature and utilizes additional fluid reserve in order to maintain straight machine movement.

19 Claims, 4 Drawing Sheets

(56) References Cited

U.S. PATENT DOCUMENTS

| | | |
|---|---|---|
| 4,086,767 A | 5/1978 | Byers, Jr. |
| 4,103,489 A | 8/1978 | Fletcher et al. |
| 4,399,886 A | 8/1983 | Pollman |
| 4,461,147 A | 7/1984 | Myers |
| 4,523,892 A | 6/1985 | Mitchell et al. |
| 4,531,601 A | 7/1985 | Barbagli |
| 4,534,707 A | 8/1985 | Mitchell |
| 4,590,568 A * | 5/1986 | Barske .................. B60K 31/18 701/123 |
| 4,739,616 A | 4/1988 | Myers |
| 4,932,208 A | 6/1990 | Koyama et al. |
| 5,001,900 A | 3/1991 | Sasajima et al. |
| 5,048,293 A | 9/1991 | Aoyagi |
| 5,177,964 A | 1/1993 | Tanaka et al. |
| 5,178,229 A | 1/1993 | Strenzke |
| 5,246,081 A | 9/1993 | Engle |
| 5,394,696 A | 3/1995 | Eich et al. |
| 5,419,128 A | 5/1995 | Asano et al. |
| 5,553,453 A | 9/1996 | Coutant et al. |
| 5,574,642 A | 11/1996 | Cooper |
| 5,590,041 A | 12/1996 | Cooper |
| 5,873,427 A | 2/1999 | Ferguson et al. |
| 6,445,990 B1 * | 9/2002 | Manring .............. B62D 55/125 114/144 R |
| 6,739,128 B2 | 5/2004 | Boyer et al. |
| 7,146,263 B2 | 12/2006 | Guven et al. |
| 7,147,078 B2 | 12/2006 | Teslak et al. |
| 7,210,293 B2 | 5/2007 | Fukasawa et al. |
| 7,287,620 B2 | 10/2007 | Thomas et al. |
| 7,469,534 B2 | 12/2008 | Nishi et al. |
| 7,798,272 B2 | 9/2010 | Pruitt et al. |
| 7,930,843 B2 | 4/2011 | Hartwick |
| 8,020,659 B2 | 9/2011 | Schultz et al. |
| 2005/0177291 A1 | 8/2005 | Strashny et al. |
| 2006/0070746 A1 | 4/2006 | Lumpkins et al. |
| 2007/0119163 A1 * | 5/2007 | Tatsuno .......... B60W 30/18072 60/493 |
| 2008/0103638 A1 * | 5/2008 | Young .................. B62D 11/003 701/1 |
| 2010/0137102 A1 | 6/2010 | Sopko, Jr. et al. |
| 2010/0154403 A1 | 6/2010 | Brickner et al. |
| 2010/0280736 A1 * | 11/2010 | Falkenstein ......... B60W 20/108 701/102 |
| 2011/0084638 A1 * | 4/2011 | Patel ....................... B60K 1/02 318/400.32 |
| 2011/0202243 A1 | 8/2011 | Ishibashi et al. |
| 2012/0076670 A1 | 3/2012 | Rampen et al. |
| 2012/0152642 A1 | 6/2012 | Takahashi et al. |

* cited by examiner

STRAIGHT TRACKING CONTROL SYSTEM FOR A MACHINE WITH A DUAL PATH ELECTRONICALLY CONTROLLED HYDROSTATIC TRANSMISSION

CROSS-REFERENCE TO RELATED APPLICATIONS

This application claims the benefit of U.S. Provisional Application No. 61/740,750, filed Dec. 21, 2012, entitled STRAIGHT TRACKING CONTROL SYSTEM FOR A CRAWLER-TRACTOR, U.S. Provisional Application No. 61/740,772, filed Dec. 21, 2012, entitled LOAD CONTROL FOR MACHINES WITH HYDROSTATIC TRANSMISSION AND/OR IMPLEMENT SYSTEM, U.S. Provisional Application No. 61/740,788, filed Dec. 21, 2012, entitled CONTROL SYSTEM FOR A HYDROSTATIC SYSTEM, U.S. Provisional Application No. 61/740,811, filed Dec. 21, 2012, entitled CONTROL SYSTEM FOR A HYDROSTATIC SYSTEM USING SCALED RAMPS, which Applications are incorporated by reference herein in their entirety.

BACKGROUND

The present application relates generally to control systems for machines with electronically controlled hydrostatic transmissions. The present application relates more specifically to a straight tracking control system for a machine having a dual path electronically controlled hydrostatic transmission.

One type of machine with a dual path electronically controlled hydrostatic transmission can be a crawler-tractor such as a bulldozer. "Bulldozers" or "dozers," as those terms may be used herein, refer to crawler-tractors that are equipped with a blade for scraping the ground or pushing material along the ground. The blade is pivotally connected to the crawler-tractor chassis such that it can pivot up and down. Blade controls are provided to the operator in the cab of the vehicle to permit the operator to raise and lower the blade with respect to the chassis of the crawler-tractor. One of the most common uses for blades on bulldozers is to level or otherwise contour the ground for the construction of houses, buildings, parking lots, and roads. During the process of leveling or contouring the ground, the operator of the bulldozer may want to travel in a straight direction for a variety of reasons such as efficiency and simplicity.

The bulldozer can have a dual path electronically controlled hydrostatic transmission or ground drive system that is used for the propulsion and steering of the bulldozer. Machines with a dual path electronically controlled hydrostatic transmission, such as the bulldozer or other crawler-tractor, can have an independent pump and motor to drive each of the left side and the right side of the machine's driveline or a single pump to control motors on each of the left and right side of the machine's driveline. At times, the pump and/or motor displacement on each side of the driveline can vary in an unpredictable manner due to various reasons, including manufacturing tolerances, hydraulic driveline inefficiencies, "wear and tear" of the pump and motor components, loading conditions, etc., that can result in non-straight, i.e., curved or angled, movement of the machine when the machine is commanded or steered in a straight direction.

Therefore, what is needed is a control system for machines with dual path electronically controlled hydrostatic transmissions that can maintain a straight direction of travel for the machine when commended straight by an operator driving the machine.

SUMMARY

The present invention is directed to a method for controlling a machine. The method includes providing a machine having an input device, a first side and a second side opposite the first side. The input device controls a drive system for each of the first side and the second side. The method further includes receiving a first command value and a second command value from the input device, comparing the first command value and the second command value and executing a control algorithm with a controller. The control algorithm includes providing the second command value to the second side drive system, determining a speed difference between the first side drive system and the second side drive system, adjusting the first command value in response to the determined speed difference and the first command value being equal to the second command value, and providing the adjusted first command value to the first side drive system.

The present invention is also directed to a control system for a machine. The control system includes a first drive system and a second drive system. The first drive system includes: a first forward solenoid and a first reverse solenoid; a first pump controlled by the first forward solenoid and the first reverse solenoid; and a first motor powered by the first pump. The second drive system includes: a second forward solenoid and a second reverse solenoid; a second pump controlled by the second forward solenoid and the second reverse solenoid; and a second motor powered by the second pump. The control system also includes an operator input device. The operator input device generates a first command to control the first drive system and a second command to control the second drive system in response to user manipulation of the operator input device. The control system further includes a first sensor to measure a speed of the first motor, a second sensor to measure a speed of the second motor and a controller to generate a control value using the measured speed of the first motor and the measured speed of the second motor in response to the first command and the second command being equal. The control system includes a subtractor to generate a control signal for the first forward solenoid and the first reverse solenoid using the control value and the first command. The second forward solenoid and the second reverse solenoid receives the second command.

One embodiment of the present application is directed to a straight tracking control system that can use a control method to achieve a desired straight motion of a machine with a dual path electronically controlled hydrostatic transmission. In the control method, the first drive system, e.g., the left or right drive system, and pump solenoid current can be modified based on first and second drive system velocity feedback when the machine is commanded to move in a straight line path in the forward or reverse direction. A memory latching concept is used to latch the straight tracking factor or offset at the initiation of and during a turn so the same straight tracking factor or offset is used throughout the turn. The straight tracking factor is unlatched at the completion of a turn after a specific time delay and a new straight tracking factor is then calculated. The straight tracking method also utilizes transmission fluid temperature and utilizes additional fluid reserve in order to maintain straight machine movement.

Another embodiment of the present application is directed to a system and method for implementing straight tracking on a dual path electronically controlled hydrostatic transmission utilizing speed sensors and temperature feedback.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

In one exemplary embodiment, a machine with a dual path electronically controlled hydrostatic transmission (also referred to as a dual path electro-hydraulic transmission) can be a crawler-tractor. "Crawler-tractor" refers to any of the class of work vehicles having a chassis, with an engine and ground-engaging endless-loop tracks that are located on either side of the chassis, that are driven by the engine, and that move the chassis over the ground. "Dozer" or "bulldozer" as used herein refers to a crawler-tractor coupled to a blade. Other examples of crawler-tractors, in addition to bulldozers, can include harvesters, excavators and compact track loaders. Other examples of machines with dual path electro-hydraulic transmissions can include wheeled harvesters, wheeled excavators and wheeled compact loaders.

Figure 1:
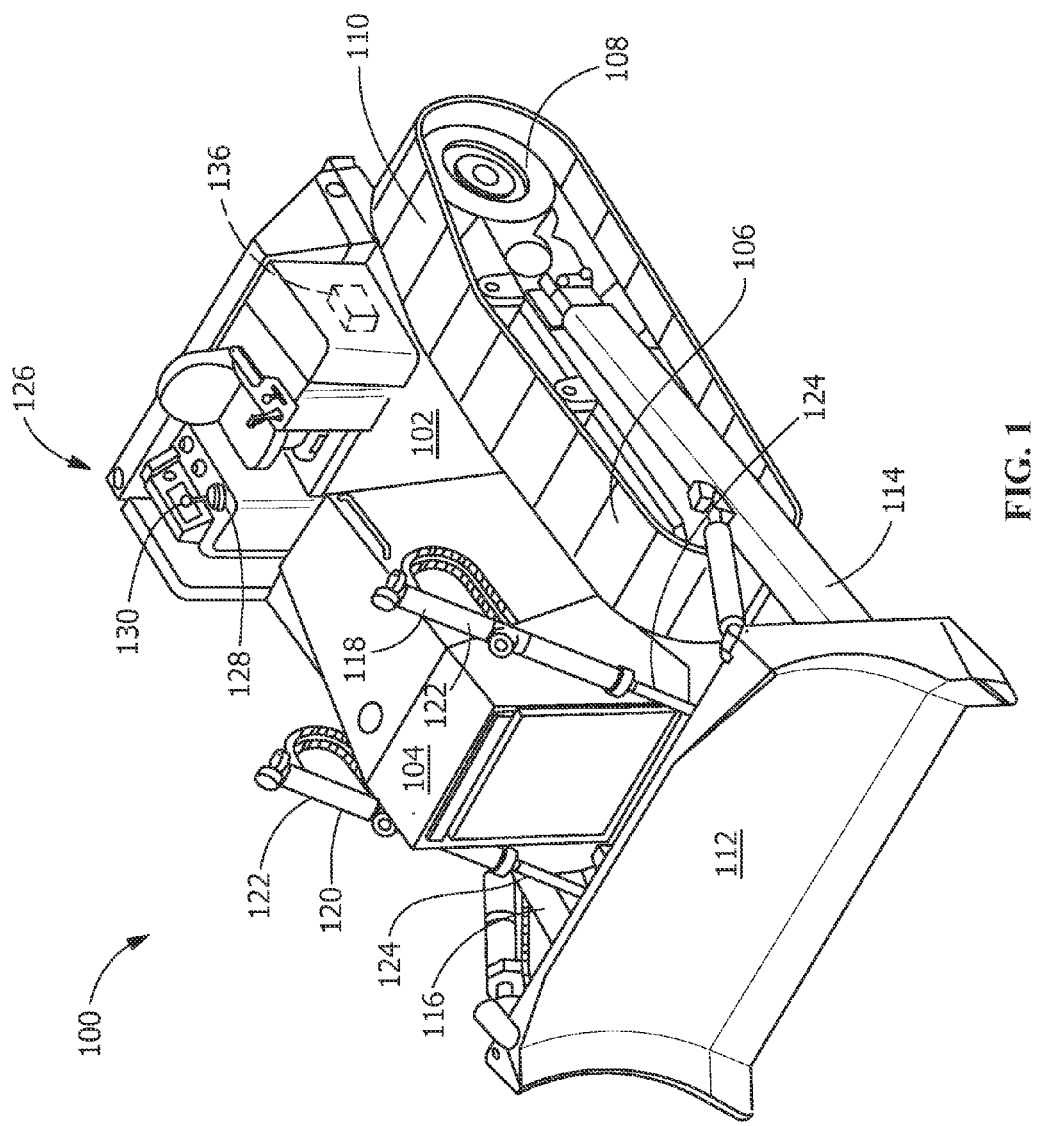
FIG. 1 shows a perspective view of an exemplary embodiment of a machine.

Referring to FIG. 1, a crawler-tractor is shown. The crawler-tractor 100 includes a chassis 102 and an engine 104 fixed to the chassis 102. Crawler-tractor 100 also includes left side and right side drive systems 106, each of which includes a drive wheel 108 that is driven by a motor and an endless track 110 that is coupled to and driven by the drive wheel 108. The crawler-tractor 100 also includes a laterally extending blade 112 that is mounted to a left arm 114 and a right arm 116. Since the crawler-tractor shown in FIG. 1 includes a blade 112, the crawler-tractor 100 can also be referred to as a dozer 100. The arms 114, 116 of the dozer 100 can be pivotally coupled to the chassis 102 at the ends of the arms 114, 116 opposite the blade 112. The arms 114, 116 can be assisted in supporting the blade 112 by left and right hydraulic lift cylinders 118, 120. The left and right cylinder portions 122 of the hydraulic lift cylinders 118, 120 are coupled to the chassis 102 and the left and right rod ends 124 are coupled to the blade 112. When the operator extends or retracts cylinders 118, 120, the cylinders 118, 120 increase or decrease in length and lower or raise blade 112.

The operation of the dozer 100 can be controlled by an electronic controller 136. Electronic controller 136 can be a digital microprocessor-based controller having a RAM (random access memory), ROM (read only memory), CPU (central processing unit), sensor input and signal conditioning circuits, valve driver circuits, other memory devices, communications and interface circuits, and other control related components. The sensors and switches are coupled to the sensor input and signal conditioning circuits, the pilot valves and solenoids can be coupled to the valve driver circuits and other digital controllers can be coupled to the communications circuit. The ROM and other memory devices can store the CPU instructions that constitute the programs that are used in the operation of the dozer 100, the RAM and other memory devices can provide working space for the CPU to store values that change during operation, and the CPU executes the program instructions stored in ROM. All of these components can be coupled together by data, address and control buses in a conventional manner.

Dozer 100 has an operator's compartment or cab 126 from which the operator operates dozer 100. Among other controls, the cab 126 can include an operator input device 128 that the operator manipulates to "steer" and control the speed of the dozer 100. In one embodiment, the operator input device 128 can include a lever 130 with a neutral central position. Each of the left side and right side drive systems 106 are controlled with the operator input device 128. The operator input device 128 can be used to provide steering and speed control commands to each of the left side and right side drive systems 106 based on the "x-y" displacement of the operator input device 128 from the neutral (or center) position. In one embodiment, the operator can instruct the drive systems 106 by moving the input device 128 in one direction from neutral to move the machine or dozer 100 forward and can move the input device 128 in the other direction to move the machine or dozer 100 backward. By controlling the direction and amount that the operator input device 128 is moved from the neutral position, the operator can control the speed and direction of the machine or dozer 100. When the operator moves the operator input device 128 in only the "y" direction, the operator is commanding the dozer 100 to travel in a straight direction. To prevent the dozer 100 from drifting from its straight path, a straight tracking control system can be used to maintain the dozer 100 along its intended straight path.

The straight tracking control system can use a master-slave control approach to achieve the desired straight motion of the crawler-tractor or any other machine with a dual path electronically controlled hydrostatic or electro-hydraulic transmission or ground drive system. In one exemplary embodiment described in greater detail in the following paragraphs, the control system can execute a straight tracking control algorithm to control the left track (or slave track) to follow the velocity of the right track (or master track) by controlling the solenoid current to the left pump 204 (see FIG. 2). In the straight tracking control algorithm, the left pump forward and reverse solenoid currents can be controlled using a control method based on the difference of the left and right driveline velocity or speed feedback or data. In another embodiment, the straight tracking control system can use the left track as the "master" and the right track as the "slave."

Figure 2:
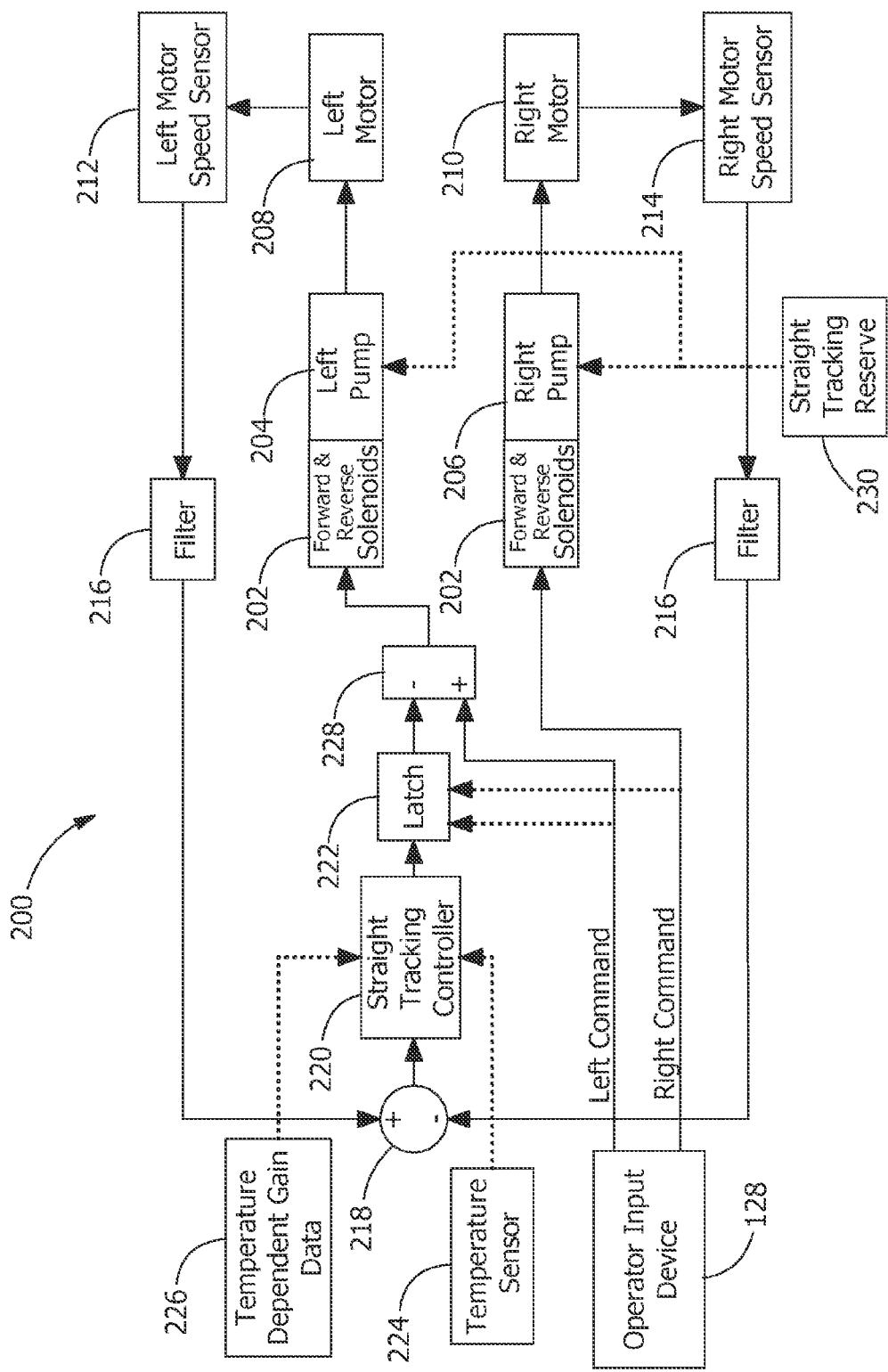
FIG. 2 shows a block diagram of an exemplary embodiment of a straight tracking control system for a machine with a dual path electronically controlled hydrostatic transmission.

FIG. 2 shows an embodiment of a straight tracking control system for a machine with a dual path electronically controlled hydrostatic transmission such as a crawler tractor or the dozer 100. The straight tracking control system 200 can be part of the controller 136 either as an integrated system or a "stand-alone" subsystem. In other embodiment, the straight tracking control system can be separate system that can operate with little or no interaction with controller 136.

The straight tracking control system 200 can be used to provide control signals or instructions to forward and reverse solenoids 202 that are used to control the displacement of a left pump 204 and a right pump 206. The left pump 204 provides power to a left motor 208 which in turn drives a corresponding left drive wheel 108 and left track 110 (if a track vehicle). The right pump 206 provides power to a right motor 210 which in turn drives a corresponding right drive wheel 108 and right track 110 (if a track vehicle). A left motor speed sensor 212 can be used to measure the speed of left motor 208 and a right motor speed sensor 214 can be used to measure the speed of right motor 210. In another embodiment, speed sensors that measure the corresponding speeds of left and right drive wheels 108 and/or left and right tracks 110 (if a track vehicle) can be used either in addition to or in place of speed sensors 212, 214.

Figure 3:
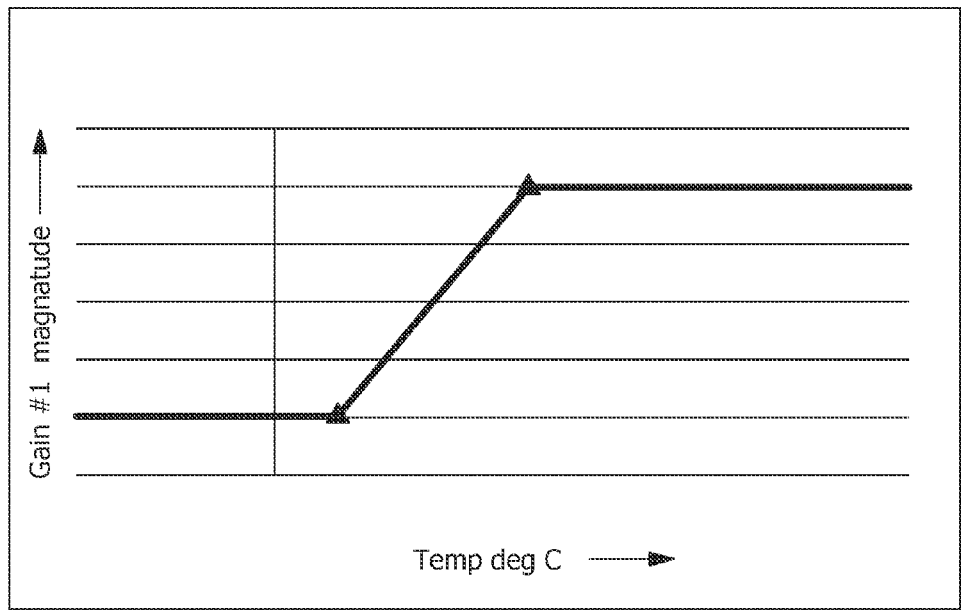
FIGS. 3 and 4 show exemplary embodiments of graphs of control gains versus transmission oil temperature that can be used with the straight tracking controller.
Figure 4:
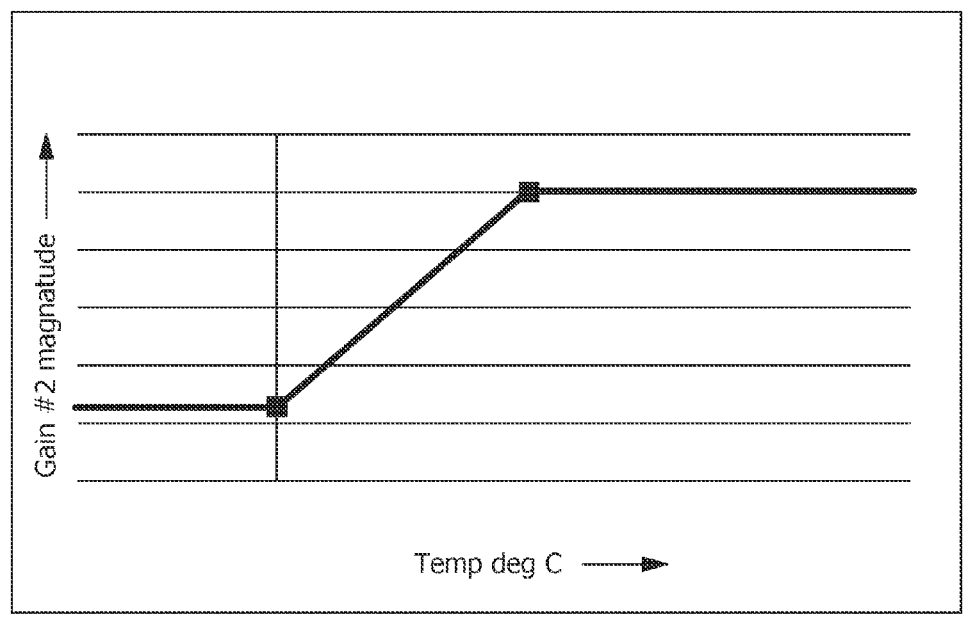

The signals from the left and right motor speed sensors 212, 214, or other speed sensors used by the system 200, can be filtered by filters 216. The filtered signals from filters 216 are provided to a first subtractor 218 which subtracts the filtered speed signal of the right motor speed sensor 214 from the filtered speed signal of the left motor speed sensor 212. The difference between the filtered left motor speed signal and the filtered right motor speed signal calculated by the first subtractor 218 is supplied to a straight tracking controller 220. The straight tracking controller 220 can be a microprocessor based controller that can execute numerous algorithms including a PI (Proportional-Integral) control algorithm to generate or calculate the appropriate control signal. The straight tracking controller 220 can provide a straight tracking controller output (or correction factor), that can be based on the speed difference between the left and right tracks, to a latch 222 or to another memory device. In one embodiment, the straight tracking controller can apply gain amounts to the difference signal. The control gain amounts applied by the straight tracking controller 220 can be based on a temperature signal from a temperature sensor 224. Temperature sensor 224 can be used to measure the transmission oil temperature for the machine, e.g., the dozer 100. After receiving the signal corresponding to the transmission oil temperature from the temperature sensor 224, the straight tracking controller 220 selects or receives from a memory device 226 the appropriate control gain value that correspond to the particular transmission oil temperature value. In one exemplary embodiment, a proportional gain value and an integral gain value can be provided if a PI control algorithm is used. The memory device 226 stores data correlating the gain amounts to ambient temperatures in any suitable format including charts, graphs, tables, etc. FIGS. 3 and 4 show exemplary embodiments of gain charts that can be stored in memory device 226 and used by the straight tracking controller 220. In addition, in another embodiment, the memory device 226 can include numerous gain charts that are tuned to or correspond to different types of crawler-tractors 100. The specific gain charts that are used by the straight tracking controller 220 for a straight tracking control algorithm can either be preselected based on the specific machine or crawler-tractor 100 into which the system 200 is installed or the operator can use an appropriate interface to select the desired gain charts that are used by the straight tracking controller 220 to satisfy specific performance requirements of the operator.

At the initiation of a turn by the operator, the latch 222 stores or freezes the straight tracking controller output or signal from the straight tracking controller 220 and does not change the stored value until after the turn has been completed and a predetermined time delay has elapsed. When the machine is commanded to move straight by the operator, the latch does not store or freeze the straight tracking controller output or signal (i.e., the input to the latch 222 and the output of the latch 222 are the same value) and provides the straight tracking controller output to a second subtractor 228. The second subtractor 228 subtracts the straight tracking controller output from the left drive command control signal received from the operator input device 128 and provides the resultant signal to the solenoids 202 for the left pump 204. During turns, the latch 222 stores the last calculated straight tracking controller output before the turn and provides the stored straight tracking controller output to the second subtractor 228. The right drive command control signal received from the operator input device 128 is provided directly to the solenoids 202 for the right pump 206 during both straight tracking operations and turning operations.

A straight tracking reserve 230 can be used to provide additional flow to the left and right pumps 204, 206, as needed, during execution of the straight tracking control algorithm to guarantee that the machine or tractor-crawler 100 can maintain a straight path. In one exemplary embodiment, the straight tracking reserve 230 can be used by the straight tracking control system to provide additional fluid to the left pump or slave pump 204 to avoid saturation of the pump flow when the left pump 204 receives a command signal from the straight tracking control algorithm to operate at a speed greater than the maximum speed of the machine. In another exemplary embodiment, the straight tracking reserve 230 is used to provide additional flow to the motors by increasing pump displacement beyond the nominal maximum pump displacement during maximum vehicle speed while not executing a turning operation.

FIGS. 3 and 4 show exemplary embodiments of gain charts used by the straight tracking controller. In one exemplary embodiment using a PI control algorithm, FIG. 3 can correspond to an integral gain chart and FIG. 4 can correspond to a proportional gain chart. Both the proportional gain charts and the integral gain charts are configured to have an increasing gain amount over a predetermined temperature range until a saturation level is reached. Once the saturation level is reached, the magnitude of the gain remains constant regardless of increasing temperature. The amounts of the gain and the corresponding temperature ranges can be selected or determined to obtain specific performance characteristics.

Figure 5:
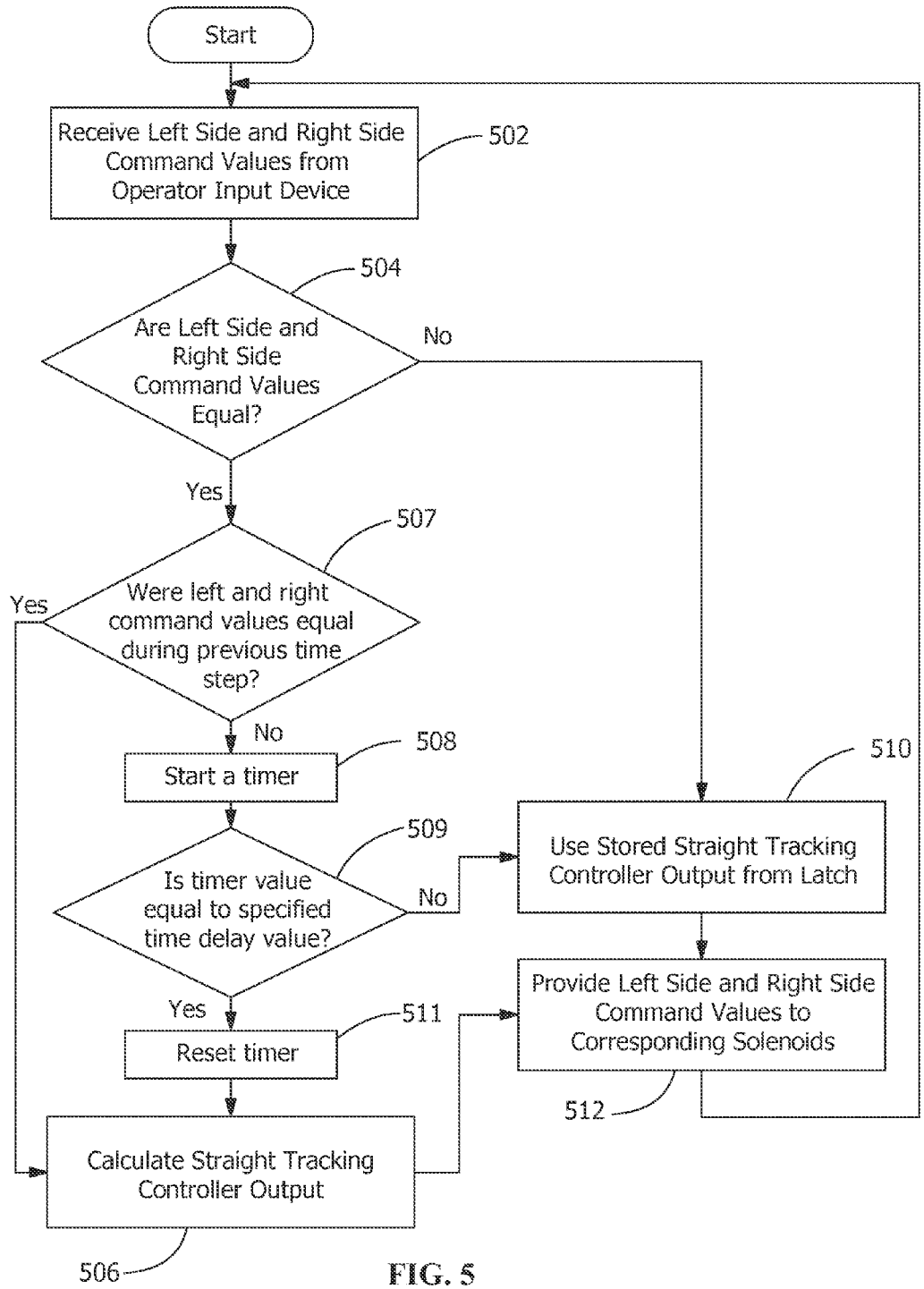
FIG. 5 shows an exemplary process for implementing straight tracking control on a machine.

FIG. 5 shows an exemplary process for implementing straight tracking control on a machine or crawler-tractor. The process begins by receiving the left side and right side command values from the operator input device 128 (step 502). A determination is made on whether the left side and right side command values are equal (step 504). If the left side and right side command values are equal, then the operator is steering the crawler-tractor in a straight direction and straight tracking control is needed. In response to the left side and right side command values being equal, a determination is made on whether the left and right side command values were equal during the previous time step (step 507). In response to the left side and right side command values being equal during the previous time step, a straight tracking controller output is calculated (step 506) and provided to the second subtractor 228 through latch 222. After that, the left side and right side command values are calculated and provided to corresponding solenoids 202 of the left and right pumps 204, 206 (step 512). The process then returns to receive new left side and right side command values. In response to the left side and right side command values not being equal during the previous time step, a timer is started (step 508). A determination is then made on whether the timer value equals a predetermined time delay value (step

509). In response to the timer value being equal to the predetermined time delay value, the timer value is reset (step 511) and the straight tracking controller output is calculated (step 506) and provided to the second subtractor 228 through latch 222. In response to the timer value not being equal to the predetermined time delay value, the most recently calculated straight tracking controller output from latch 222 is used (step 510) for the left side and right side command values.

In response to the left side and right side command values not being equal in step 504, i.e., the operator is steering the machine or crawler-tractor to make a turn or travel at an angle, the most recently calculated straight tracking controller output is stored in latch 222 and used for the duration of the turn (step 510). After that, the left side and right side command values are provided to corresponding solenoids 202 of the left and right pumps 204, 206 (step 512). The process then returns to receive new left side and right side command values.

In other words, the straight tracking control algorithm remains ON at all times, but is active or used only in the case of identical left and right driveline commands from the operator. In the case of non-identical left and right command values, e.g., when performing a left or right turn, the straight tracking controller output to the left pump 204 is latched at the initiation of turn and remains latched during the turning operation. Once left and right driveline commands are equal again, the straight tracking controller output is unlatched, possibly with a time delay, and straight tracking control becomes active. With this approach the straight tracking control algorithm does not interfere with the operations during left and right turns.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any non-transitory machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already be widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method for controlling a machine, the method comprising:

providing a machine having an input device, a first side and a second side opposite the first side, the input device controlling a drive system for each of the first side and the second side;

receiving a first command value and a second command value from the input device;

comparing the first command value to the second command value;

executing a control algorithm with a controller, the control algorithm comprising:

providing the second command value, unmodified, to the second side drive system;

determining a speed difference between the first side drive system and the second side drive system;

adjusting the first command value in response to the determined speed difference if the first command value is equal to the second command value; and providing the adjusted first command value to the first side drive system.

2. The method of claim 1 wherein said adjusting the first command value further comprises applying an adjusting control algorithm to the determined speed difference to generate an adjusted speed difference, said adjusting control algorithm comprising:

measuring a transmission oil temperature; and selecting a gain value used in the adjusting control algorithm in response to the measured transmission oil temperature.

3. The method of claim 2 wherein said adjusting the first command value further comprises adjusting the first command value in response to said adjusted speed difference based on the determined speed difference.

4. The method of claim 1 wherein said adjusting the first command value further comprises providing the determined speed difference and the first command value to a subtractor to generate the adjusted first command value.

5. The method of claim 1 further comprising storing the determined speed difference if the first command value becomes different from the second command value.

6. The method of claim 5 further comprising providing the first command value to the first side drive system in response to the first command value becoming different from the second command value.

7. The method of claim 5 further comprising releasing the stored determined speed difference in response to a subsequently received first command value being equal to a subsequently received second command value.

8. The method of claim 7 wherein said releasing the stored determined speed difference comprises executing a time delay before releasing the stored determined speed difference.

9. The method of claim 1 wherein said determining a speed difference comprises:

measuring a speed of a first side motor of the first side drive system;

measuring a speed of a second side motor of the second side drive system;

filtering the measured first side motor speed and the measured second side motor speed; and providing the filtered first side motor speed and the filtered second side motor speed to a subtractor to determine the speed difference.

10. A control system for a machine comprising:

a first drive system comprising:

a first forward solenoid and a first reverse solenoid;

a first pump controlled by the first forward solenoid and the first reverse solenoid; and a first motor powered by the first pump;

a second drive system comprising:

a second forward solenoid and a second reverse solenoid;

a second pump controlled by the second forward solenoid and the second reverse solenoid; and a second motor powered by the second pump;

an operator input device, the operator input device generating a first command to control the first drive system and a second command to control the second drive system in response to user manipulation of the operator input device;

a first sensor to measure a speed of the first motor;

a second sensor to measure a speed of the second motor;

a controller operable to compare the first command value to the second command value, and to generate a control value using the measured speed of the first motor and the measured speed of the second motor if the first command and the second command are equal;

a subtractor to generate a control signal for the first forward solenoid and the first reverse solenoid using the control value and the first command; and the second forward solenoid and the second reverse solenoid receiving the second command unmodified.

11. The control system of claim 10 further comprising a memory device to store the control value if the first command and the second command become different.

12. The control system of claim 11 wherein the memory device comprises a latch.

13. The control system of claim 11 wherein the memory device releases the stored control value to the subtractor in response to a subsequently generated first command and a subsequently generated second command becoming equal.

14. The control system of claim 13 further comprising a timer to provide a time delay before the memory device releases the stored control value.

15. The control system of claim 10 wherein the controller comprises:

a second subtractor;

a microprocessor operable to execute a proportional-integral control algorithm to generate the control value; and the second subtractor receiving the measured speed of the first motor and the measured speed of the second motor and generating a difference value for use by the proportional-integral control algorithm.

16. The control system of claim 15 further comprising:

a temperature sensor to measure a transmission oil temperature;

a memory device to store first proportional gain values and second integral gain values for corresponding temperature values; and the control algorithm generates the control value using a first proportional gain value corresponding to the measured a transmission oil temperature and a second integral gain value corresponding to the measured a transmission oil temperature.

17. The control system of claim 16 wherein:

the first proportional gain values stored in the memory device range between a first maximum value and a first minimum value, the first proportional gain values are the first minimum value for a first range of temperatures, the first proportional gain values are the first maximum value for a second range of temperatures different from the first range of temperatures, and the first proportional gain values increase from the first minimum value to the first maximum value for a third range of temperatures between the first range of temperatures and the second range of temperatures; and the second integral gain values stored in the memory device range between a second maximum value and a second minimum value, the second integral gain values are the second minimum value for a fourth range of temperatures, the second integral gain values are the second maximum value for a fifth range of temperatures different from the fourth range of temperatures, and the second integral gain values increase from the second minimum value to the second maximum value for a sixth range of temperatures between the fourth range of temperatures and the fifth range of temperatures.

18. The control system of claim 10 further comprising a fluid reserve to supply additional flow to at least one of the first motor or the second motor in response to operating at the maximum machine speed and executing a straight tracking operation.

19. The control system of claim 10 further comprising a first filter to filter a signal from the first sensor and a second filter to filter a signal from the second sensor.

\* \* \* \* \*